Figure 1:
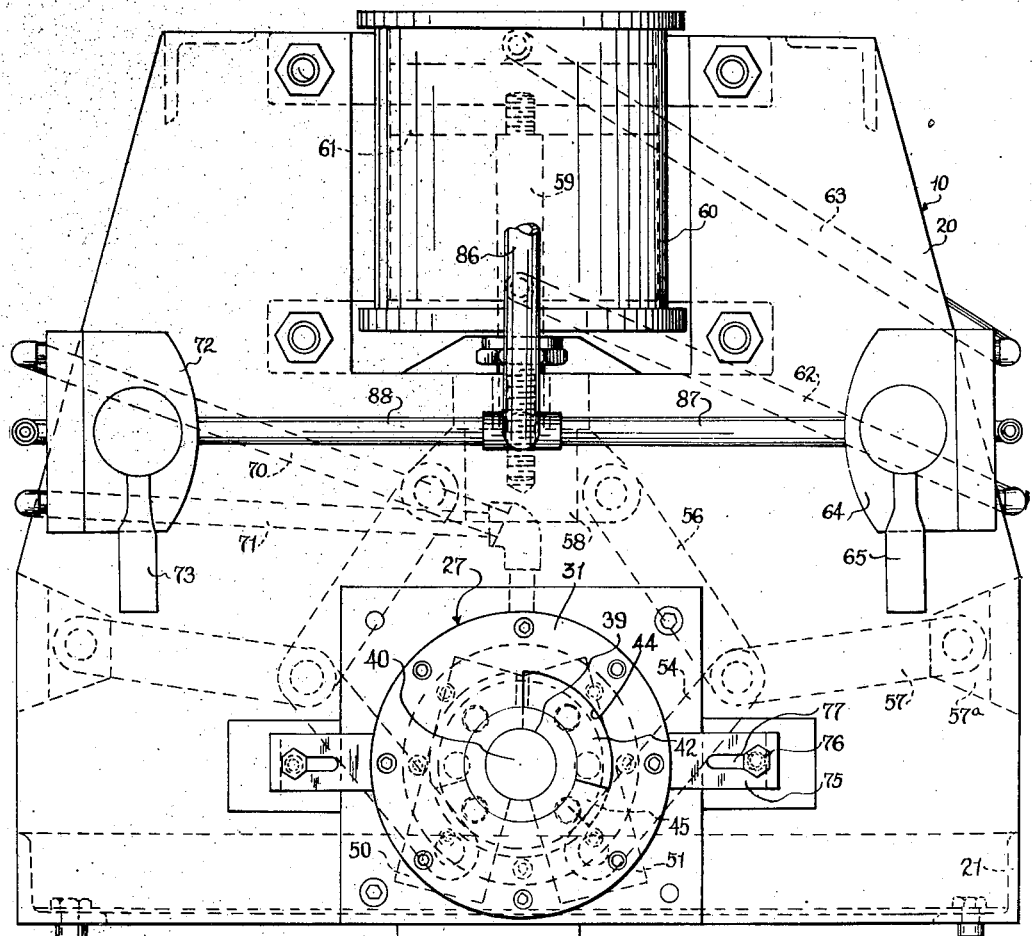

July 19, 1949.   J. B. LEECE   2,476,744
COIL SHAPING APPARATUS
Filed Sept. 11, 1946   5 Sheets-Sheet 1

INVENTOR.
JOHN B. LEECE
BY Kwis, Hudson,
Boughton & Williams
ATTORNEYS

July 19, 1949.　　　　　J. B. LEECE　　　　　2,476,744
COIL SHAPING APPARATUS
Filed Sept. 11, 1946　　　　　　　　　　　　　　5 Sheets-Sheet 2
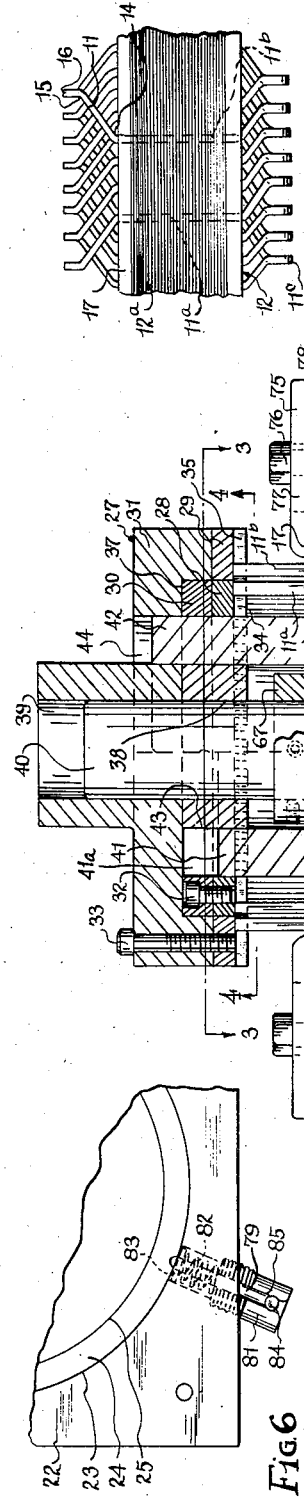
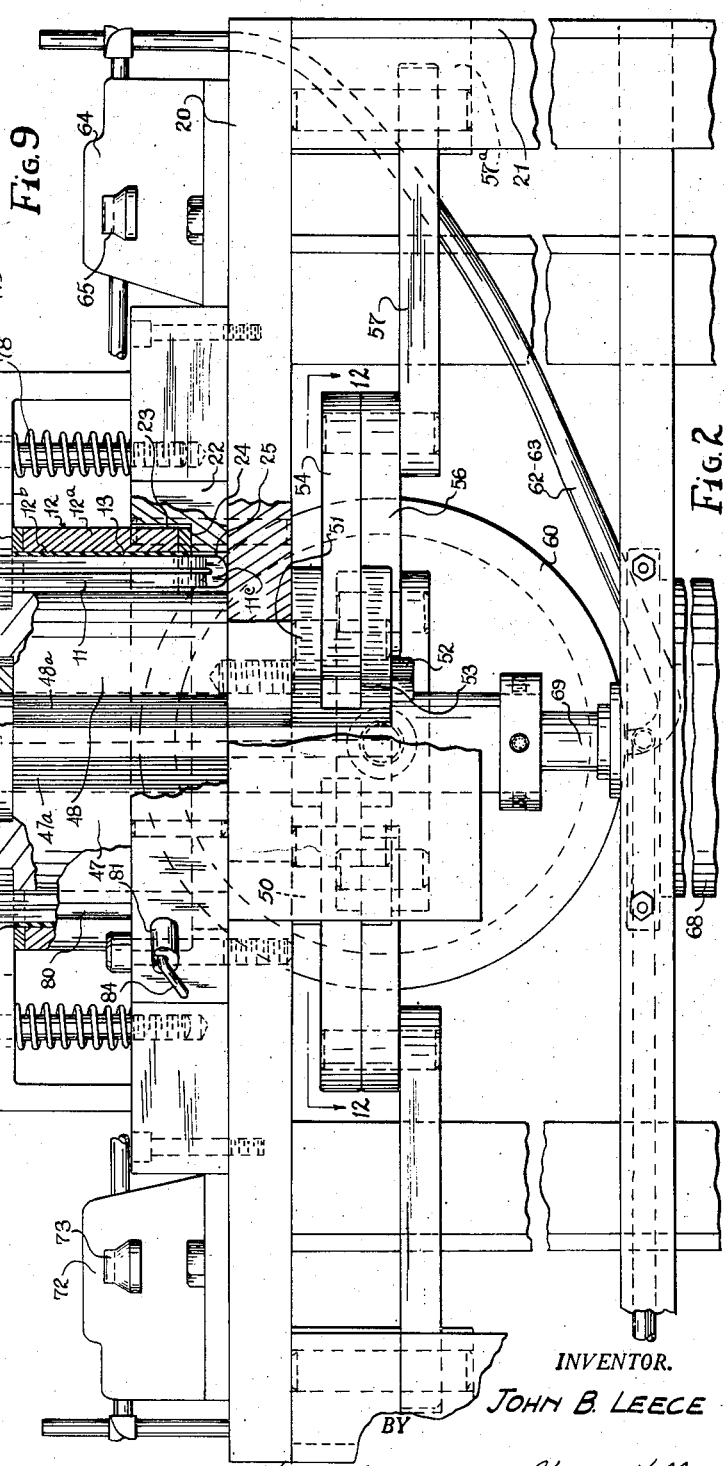
INVENTOR.
JOHN B. LEECE
BY
Kwis, Hudson, Boughton & Williams
ATTORNEYS July 19, 1949.  J. B. LEECE  2,476,744
COIL SHAPING APPARATUS
Filed Sept. 11, 1946  5 Sheets-Sheet 3

INVENTOR.
JOHN B. LEECE
BY
Kwis, Hudson, Boughton & Williams
ATTORNEYS

July 19, 1949.

J. B. LEECE 2,476,744

COIL SHAPING APPARATUS

Filed Sept. 11, 1946

5 Sheets-Sheet 4

INVENTOR.
JOHN B. LEECE
BY
Kwis, Hudson, Boughton & Williams
ATTORNEYS

INVENTOR.
JOHN B. LEECE
BY
Kwis, Hudson, Boughton & Williams
ATTORNEYS

Patented July 19, 1949

2,476,744

UNITED STATES PATENT OFFICE 2,476,744

COIL SHAPING APPARATUS

John B. Leece, University Heights, Ohio, assignor to The Leece-Neville Company, Cleveland, Ohio, a corporation of Ohio Application September 11, 1946, Serial No. 696,091

12 Claims. (Cl. 153—19)

This invention relates to fabricating apparatus for use in the manufacture of stators, armature members and the like and more particularly to apparatus for bending or shaping electrical coils which constitute a part of, or are being assembled into, such a stator or armature member.

An object of the present invention is to provide an improved apparatus of this kind by which such coils can be formed or bent to the desired shape in connection with the assembling or mounting of the coils in the stator or armature member and by which the forming or bending can be carried out rapidly and to a desired uniform extent with respect to the individual coils.

Another object of this invention is to provide improved coil shaping apparatus of this character, which includes bending die members adapted to operate simultaneously on rows of coil elements projecting from a stator or the like so as to rapidly and accurately bend the elements to certain offset positions which are necessary for making proper electrical connections with the coils.

Still another object is to provide improved coil shaping apparatus of the kind mentioned, in which the bending die members are relatively rotatable and are embodied in a die head which is adapted to be applied to the stator whose coils are to be bent.

A further object is to provide improved apparatus of the character mentioned, which includes a pair of relatively rockable die actuating spindles with which the die members are adapted to be connected for actuation thereby.

Yet another object is to provide apparatus of this kind, in which the die actuating means includes rockable complemental spindle members for causing relative rotation between the die members and an axially movable shaft for disengaging the die members from the work, and wherein the die members form a unit which is detachably mounted on the die actuating means.

The invention can be further briefly summarized as consisting in certain novel combinations and arrangements of parts hereinafter described and particularly set out in the claims hereof.

In the accompanying sheets of drawings

Figure 3:
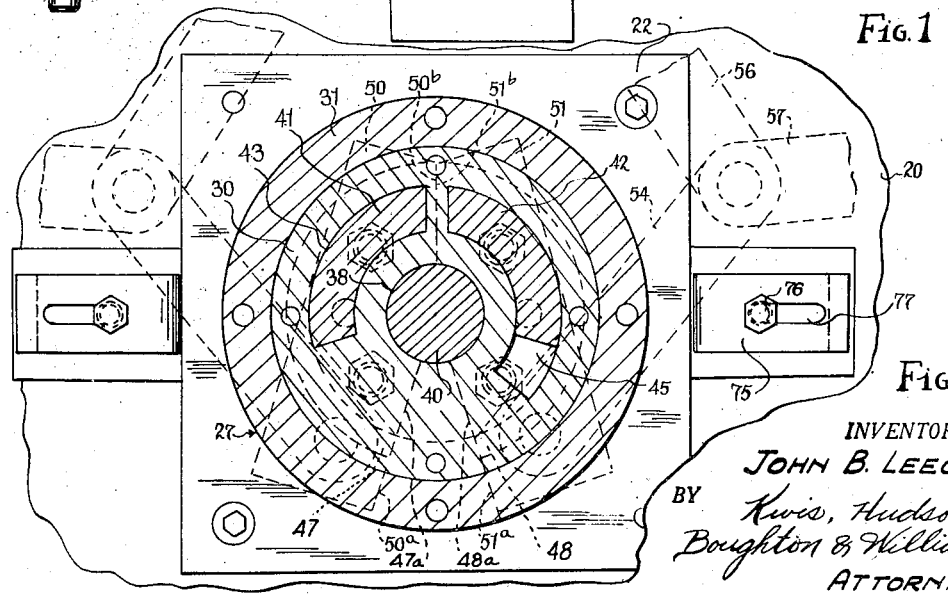
Figure 4:
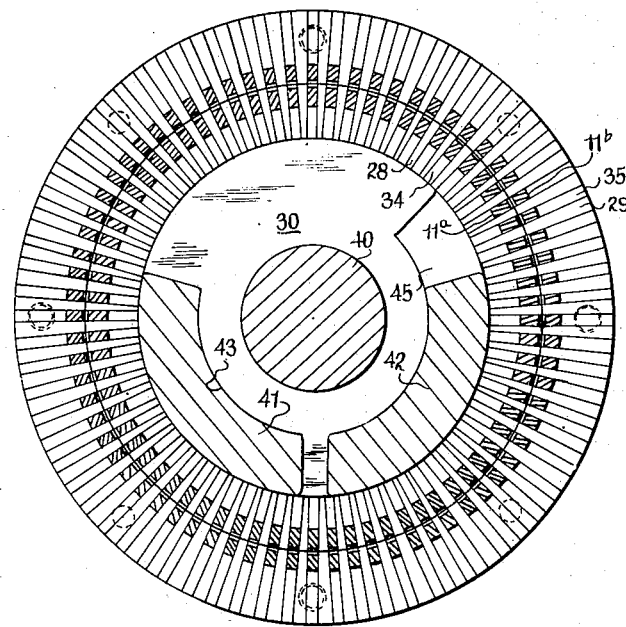
Figure 7:
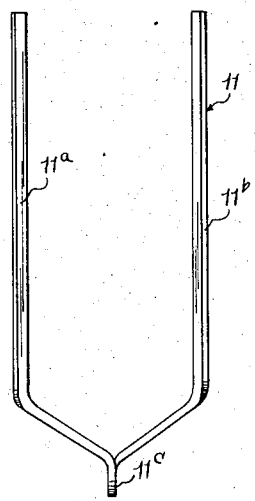
Figure 5:
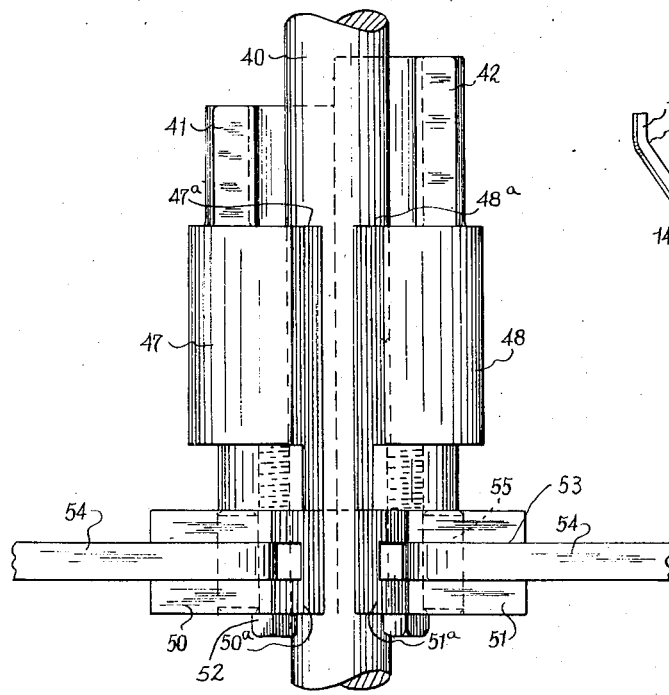
Figure 8:
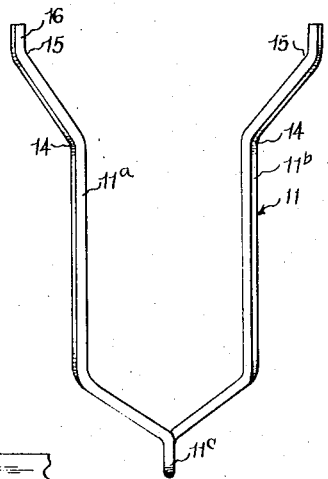
Figure 10:
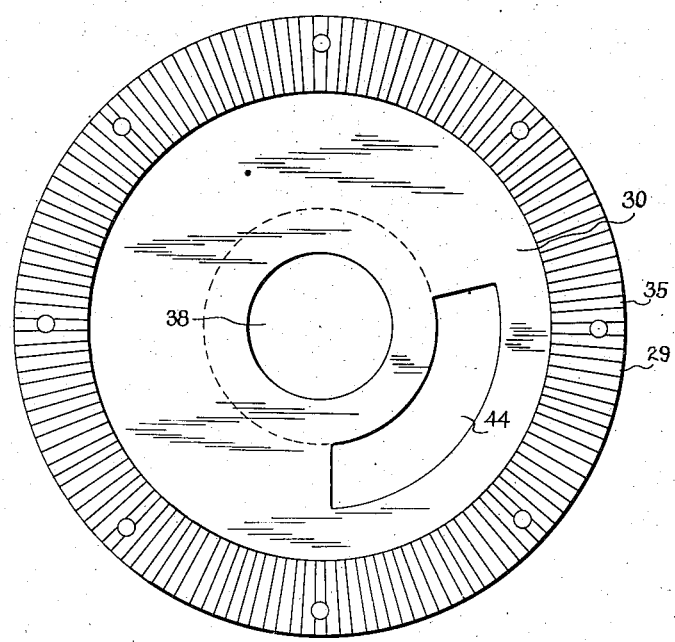
Figure 11:
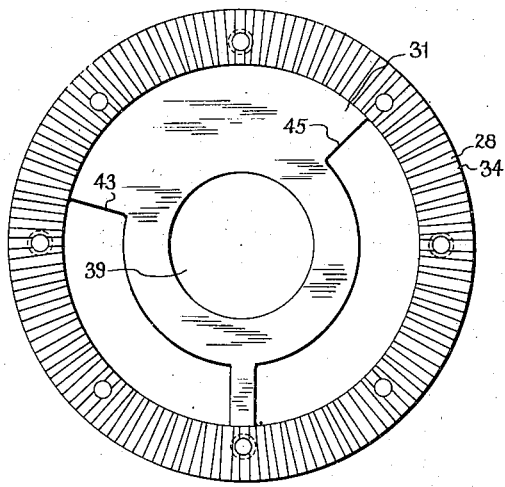
Figure 12:
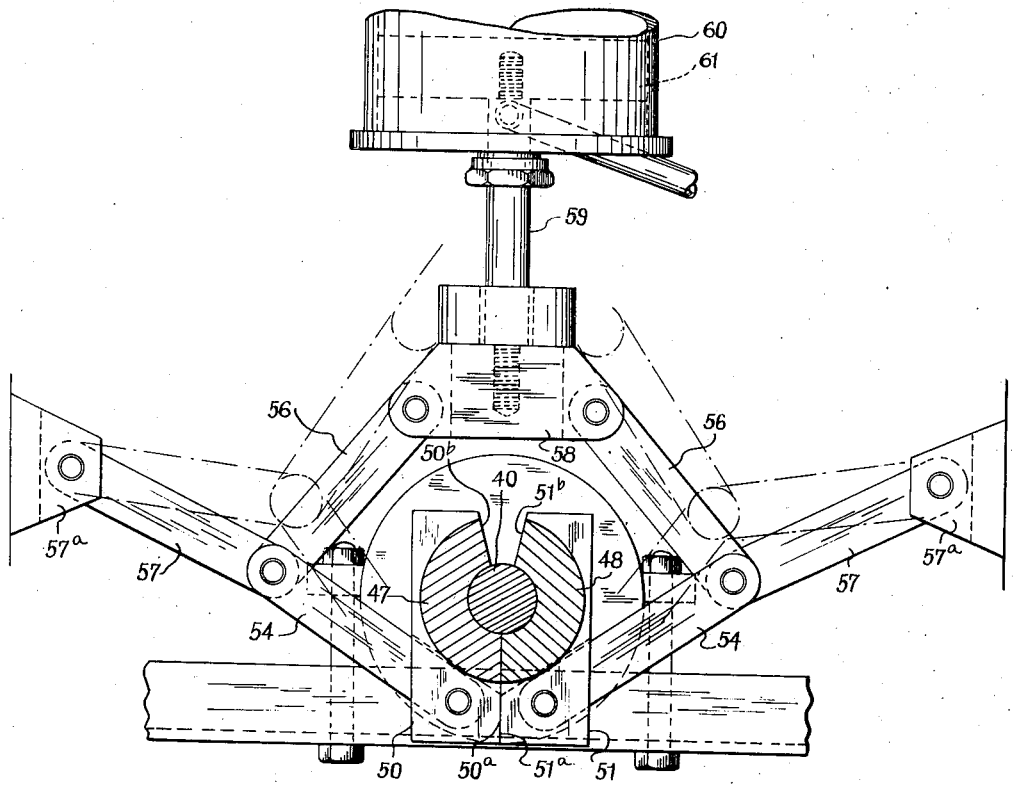
Figure 13:
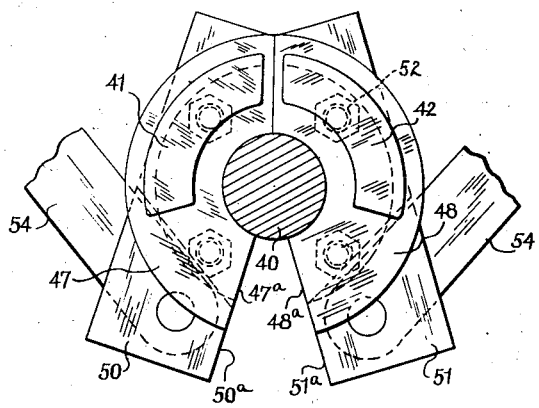

Fig. 1 is a plan view of a coil shaping apparatus embodying the present invention, Fig. 2 is a front elevational view of the apparatus showing the same with portions broken away, Fig. 3 is a partial sectional plan view taken on line 3—3 of Fig. 2 but showing the work holding clamps in their retracted position, Fig. 4 is a sectional view taken as indicated by line 4—4 of Fig. 2 and looking in an upward direction toward the underside of the die head, Fig. 5 is an elevational view of the die actuating spindles showing the same removed from the machine for purposes of better illustration, Fig. 6 is a fragmentary plan view further illustrating a releasable locking means for the work, Fig. 7 is an elevational view showing one of the electrical coils on which this apparatus operates, the coil being shown prior to the bending operation, Fig. 8 is a similar view showing the same coil after the bending operation has been performed thereon, the coil being shown isolated from the stator for clearer illustration, Fig. 9 is a partial side elevational view of a stator showing the coil of Fig. 8 in its assembled position therein, Fig. 10 is an inverted plan view of the outer die ring and the carrier therefor, Fig. 11 is an inverted plan view of the inner die ring and the carrier therefor, Fig. 12 is a horizontal section taken substantially as indicated by section line 12—12 of Fig. 2 but showing the mechanism in the completed bending position, and Fig. 13 is a plan view of the mechanism of Fig. 5.

The coil shaping apparatus 10 can be used to operate on various different specific forms of coils but by way of example is shown in this instance as being used to perform a final bending operation on electrical coils which have been assembled into a stator 12. Fig. 7 shows a coil 11 of this kind prior to its being assembled into the stator. Fig. 8 shows the same coil after the bending operation has been performed thereon by the bending machine 10.

The stator 12 is here shown as comprising a laminated ring-shaped metal body 12a having an internal annular series of circumferentially spaced slots 12b therein in which the coils 11 are assembled. As shown in Fig. 7 the coils 11 are initially of a substantially "wish bone" shape having spaced substantially parallel legs 11a and 11b which are connected at one end by a 180° bend 11c. The coils 11 are assembled in an annular series in the stator 12 by having their legs 11a and 11b inserted through the slots 12b so that each slot contains a pair of the coil legs 11a and 11b and which legs form inductor bars in the completed stator. The legs of the coils are insulated from each other and from the body of the stator by suitable insulating sleeves 13 located in the slots 12b. When the coils 11 have been thus assembled in the stator 12 the bends 11c thereof lie in an annular row on one side of the stator body and portions of the legs 11a and 11b project beyond the stator body on the opposite side thereof as shown in Fig. 2.

In the bending operation performed by the machine 10 the projecting portions of the legs 11a and 11b are spread apart to substantially the condition illustrated in Figs. 8 and 9 so that appropriate electrical connections can be made to the ends of the coil legs. In this bending operation two bends 14 and 15 are formed in each of the legs 11a and 11b as shown in Fig. 8 and, in this instance, these bends are somewhat greater than right-angle bends. The bends 15 are formed in the legs 11a and 11b at points adjacent the ends of these legs so that relatively short terminal portions 16 will be left at the ends of the coils for making the desired electrical connections thereto. The bends 14 are formed in the coil legs at a greater distance from the ends thereof and are located at or adjacent the side face 17 of the stator from which the coils project.

As shown in the drawings the coil shaping machine 10 is provided with a suitable frame which includes a generally horizontal top or table 20 and a plurality of spaced upright supporting legs 21 for such table. The machine also includes a recessed work holder 22 mounted on the table 20 and in which the stator 12 containing the coils 11 is adapted to be received and held during the bending operation which is performed on the coils. The work holder 22 is here shown as comprising a block supported on the table 20 and having a recess or opening 23 therein of a size and shape to receive the stator body 12a. The work holder also contains an annular shoulder 24 on which the stator is adapted to seat, as shown in Fig. 2, and an extension recess 25 which accommodates the projecting coil portions which include the bends 11c. The recess 25 is of a depth such that the tops of the bends 11c will engage the surface of the table 20 when the stator 12 has been placed in the work holder 22 in engagement with the seat 24. With the stator in this position in the holder 22 the coils 11 will be retained in proper position with the groups of coil legs 11a and 11b all projecting for substantially the same distance from the upper side or face of the stator.

The bending machine 10 also includes a die head 27 which is adapted to be applied to the projecting ends of the coils 11 for performing the desired bending operation thereon. The die head 27 embodies two relatively rotatable coaxial inner and outer die rings 28 and 29 and carriers 30 and 31 with which these die rings are connected, respectively, by means of the screws 32 and 33. The die ring 28 has an annular series of radial slots 34 therein in which the upper ends of the coil legs 11a engage when the die head is applied to the work as shown in Fig. 2. The die ring 29 has a similar annular series of radial slots 35 therein in which the upper ends of the coil legs 11b engage as also shown in Fig. 2.

In the construction of the die head 27 which is here illustrated the carrier 31 has a recess 37 in the underside thereof in which the carrier 30 is mounted for oscillation or rotation relative to the carrier 31. The carriers 30 and 31 have aligned central openings 38 and 39 therein by which the die head is adapted to be mounted on an upright shaft 40. This shaft forms a common axis or pivot about which the carriers 30 and 31 are adapted to be oscillated or rotated. In oscillating the carriers 30 and 31, the desired extent of arcuate movement is imparted thereto by the driving lugs 41 and 42. The carrier 30 has an arcuate slot 43 therein in which the driving lug 41 snugly engages for establishing a driving connection with this carrier. The carrier 31 likewise has an arcuate slot 44 therein in which the driving lug 42 snugly engages for forming a driving connection with this carrier. In addition to the slot 43 the carrier 30 has a second arcuate slot 45 through which the driving lug 42 for the carrier 31 extends. As shown in Figs. 3 and 4 the slot 45 is of greater arcuate length than the driving lug 42 so as to provide a desired clearance or freedom of movement for this lug which will prevent the latter from exerting any driving effect on the carrier 30.

The actuating mechanism for the carriers 30 and 31 and the die rings 28 and 29 mounted thereon includes a pair of substantially sector-shaped complemental driving members 47 and 48 with which the driving lugs 41 and 42 are connected. The driving members 47 and 48 are disposed in upright relation around the shaft 40 and are rockable thereon. In this instance the driving lugs 41 and 42 are formed as integral extensions on the upper ends of these driving members. The lower ends of the driving members 47 and 48 extend into and are journaled in an opening 50 of the table 20.

When the stator 12 is placed in the recessed work holder 22 in the position explained above and as shown in Fig. 2, it surrounds the driving members 47 and 48 so that the annular rows of coil legs 11a and 11b, the die rings 28 and 29, and the actuating members 47 and 48 are all disposed about a common axis which is the axis of the shaft 40. When the die head 27 is applied to the shaft 40, the slots 34 and 35 of the die rings 28 and 29 receive the ends of the coil legs 11a and 11b so that the die head then rests upon the upper ends of the coils. By reason of the sector-shape of the actuating members 47 and 48, these members can be rocked about the shaft 40 toward or away from each other for a desired angular distance which, in this case, is represented by an included angle of approximately 35°. In Figs. 3 and 5 this included angle is defined by the relatively inclined diverging faces 47a and 48a of the actuating members 47 and 48. When the members 47 and 48 are rocked through this angular distance they cause a corresponding relative angular movement between the die rings 28 and 29 to thereby form the bends 14 and 15 in the projecting coil legs 11a and 11b. During the bending operation the coil legs 11a and 11b are shortened and the die head 27 moves downwardly a corresponding distance on the shaft 40 which is permitted by the space 41a existing between the carrier 31 and the top of the driving lug 41.

The machine 10 includes suitable mechanism for imparting the above described rocking movement to the actuating members 47 and 48. In this instance levers 50 and 51 are attached to the lower ends of the members 47 and 48 by screws 52 and extend in relatively inclined or diverging relation as shown in Figs. 1 and 5. The levers 50 and 51 are located at the underside of the table 20 and have slots 53 therein into which the ends of toggle links 54 extend. The links 54 are pivotally connected with the levers 50 and 51 by means of the pivot pins 55. The opposite ends of the links 54 are pivotally connected with similar links 56 and also with anchor or abutment links 57, the latter links having their outer ends pivotally anchored on the table 20 by means of the brackets 57a. The links 56 have their opposite or rear ends pivotally connected with a common driving member 58 which is carried by the piston rod 59 of a power cylinder 60. The cylinder 60 is a double acting pressure fluid cylinder in which the piston 61 of the piston rod 59 is reciprocably operable. Suitable pressure fluid, such as compressed air, can be supplied to or exhausted from opposite ends of the cylinder through the connections 62 and 63 and the operation of the cylinder is controlled by a manual valve 64 having an actuating handle 65.

When the stator 12 has been placed in the work holder 22 and the die head 27 has been applied to the projecting legs of the coils 11 by being mounted on the shaft 40 as explained above, the operator actuates the valve handle 65 in a direction to cause the piston 61 of the cylinder 60 to move the common actuating head 58 in an outward direction, thereby transmitting thrust through the pairs of toggle links 56 and 54 to the levers 50 and 51 of the sector-shaped actuating members 47 and 48. This causes a rocking of the levers 50 and 51 and the actuating members 47 and 48 connected therewith. The extent of this rocking movement is determined or limited by the diverging faces 50a and 51a of the levers 50 and 51 which, in this instance, also define an included angle of approximately 35°. When these diverging faces 50a and 51a come into meeting engagement the power stroke of the cylinder 60 is completed and the amount of angular rotation which will have been imparted to the members 47 and 48 and the die rings 28 and 29 will be sufficient to have produced the bends 14 and 15 in the legs 11a and 11b of the coils 11. The levers 50 and 51 also have a second pair of diverging faces 50b and 51b which are in engagement with each other when the actuating spindles 47 and 48 are in their initial or starting position.

When this working stroke of the bending operation has been completed, it is desirable that the die head 27 be disengaged from the coils 11 so that the die rings can be returned to their initial position and so that the die head can be removed from the shaft 40 to permit the removal of the stator 12 from the work holder 22. For thus disengaging the die head 27 from the coils 11 a sudden axial movement of the shaft 40 is employed in a direction to lift the die head 27 relative to the table 20. The shaft 40 is provided with a collar 67 at a suitable point thereon which engages and lifts the die head 27 during the upward axial movement of this shaft. The desired sudden axial movement can be imparted to the shaft 40 by suitable means such as the double acting power cylinder 68 shown in this instance. The cylinder 68 has a piston operable therein which is connected with the lower end of the shaft 40 by means of the piston rod 69. Pressure fluid can be supplied to and exhausted from the ends of the cylinder 68 through suitable connections 70 and 71 and can be controlled by a valve 72 having an actuating handle 73.

When the die head 27 is disengaged from the coils 11 by the upward movement of the shaft 40 as described above, the head is lifted far enough to cause the coil ends 16 to be released from the slots of the die rings 28 and 29 but not high enough to cause the sector shaped driving lugs 41 and 42 to be disengaged from the slots 43 and 44 of the carriers 30 and 31.

While the die head is in this lifted position the operator actuates the valve handle 65 in a direction to oscillate the actuating members 47 and 48 and the die rings 28 and 29 in the opposite direction through an idle stroke which returns them to their initial position shown in the drawings. After the die rings 28 and 29 have been thus returned to their initial position the operator removes the die head 27 completely from the shaft 40 and also removes the stator 12 from the work holder 22. The operator then places another stator in the work holder 22 and again applies the die head 27 to the projecting portions of the coils 11 for performing the desired bending operation thereon.

To facilitate the disengagement of the die head 27 from the coils 11 after the bending operation is performed thereon, it is desirable to hold the stator 12 firmly in the work holder 22 so that it will not be lifted by the upward movement of the die head. For this purpose work holding clamps 75 are provided which are mounted on retaining screws 76 so as to be shiftable laterally into holding engagement with the upper side or face 17 of the stator as shown in Figs. 1 and 2. In this instance the clamps 75 are of angular shape and have slots 77 in their horizontal legs through which the screws 76 extend. Compression springs 78 disposed around the screws 76 act on the clamps to take up lost motion but permit the desired sliding of the clamps into and out of holding engagement with the stator.

It is also important that the stator 12 be located in proper angular position in the holder 22 and for this purpose the holder is provided with a locking plunger 79 which is engageable in a locating slot or groove 80 of the stator. The plunger 79 is slidable in a bushing 81 and is normally urged in an inward direction by a coil spring 82 so as to engage the inner end of the plunger in the locating slot 80. The coil spring 82 acts against a pin or shoulder 83 carried by the plunger 79. The plunger can be retained in a retracted position by the engagement of its angular handle portion 84 with the outer end of the bushing 81. Movement of the plunger 79 to this retracted position is accomplished by withdrawing the same against the action of the spring 82 and then rotating the plunger so that the handle portion 84 is out of alignment with the slot 85 of the bushing. When a stator has been inserted into the work holder 22 and the locking plunger 79 is to be engaged in the locating slot 80, it is only necessary to swing the handle portion 84 to a position of alignment with the slot 85 whereupon the spring 82 will project the plunger in an inward direction to engage its inner end in the slot 80 of the stator.

The pressure fluid for operating the cylinders 60 and 68 can be obtained from a suitable source through the pipe 86 and can be supplied to the control valves 64 and 72 through the branch connections 87 and 88.

From the foregoing description and the accompanying drawings it will now be readily understood that the present invention provides improved apparatus for performing shaping or bending operations on electrical coils such as coils which have been assembled into a stator or armature member. It will also be understood that the improved apparatus provides relatively movable die members which operate to bend certain portions of the coils and novel die actuating means which includes means for causing such relative movement between the die members as well as means for disengaging the die members from the work after the bending operation has been performed. It will now also be understood that the die members are preferably embodied in a die head which is portable and is adapted to be brought into operative position relative to the work by being applied to or mounted on the die actuating means.

Although the improved coil shaping apparatus of this invention has been illustrated and described herein in some detail, it will be understood of course that the invention is not correspondingly limited in scope but includes all changes and modifications coming within the terms of the claims hereof.

Having thus described my invention, I claim:

1. In a machine for operating on electrical coils while being held in an annular group by a substantially ring shaped hollow part, an upright shaft, means for supporting said part so that the coil group is disposed in surrounding coaxial relation to said shaft, said shaft being of a length to extend above said part, a pair of spindle members rockable about said shaft and extending through and above said part, a die head removably mounted on said shaft above said part and comprising a pair of relatively rotatable die members having detachable connection with the upper ends of said spindle members for actuation thereby, said die members being adapted to engage said coils and cause bending thereof during rotation of the die members, power actuated means for rocking said spindles, said shaft being axially movable for lifting said die head and disengaging the die members from said coils, and means for imparting axial movement to said shaft.

2. In a machine for shaping electrical coils of the type having substantially parallel conductor bar portions projecting from a hollow substantially ring shaped part in which said coils are assembled, a shaft, means for supporting said part so as to locate said coils in spaced annular relation around said shaft and with said conductor bar portions disposed in two substantially concentric rows, said shaft being of a length such that the end thereof extends beyond said part, a die head mounted on said shaft above said part and including two relatively rotatable die members having substantially concentric annular rows of slots adapted to receive said conductor bar portions therein, a pair of sector members rockable about said shaft and extending through said part, said sector members having portions connected with said die members for actuating the latter to cause bending of the rows of conductor bar portions by said die members, means limiting the extent of angular movement of said sector members to correspond with the desired extent to which the conductor bar portions are to be bent, and means for causing rocking of said sector members.

3. In a machine for shaping electrical coils of the type having substantially parallel conductor bar portions projecting from a hollow substantially ring shaped part in which said coils are assembled, a shaft, means for supporting said part so as to locate said coils in spaced annular relation around said shaft and with said conductor bar portions disposed in two substantially concentric rows, said shaft being of a length such that the end thereof extends beyond said part, a die head mounted on said shaft above said part and including two relatively rotatable die members having substantially concentric annular rows of slots adapted to receive said conductor bar portions therein, a pair of sector members rockable about said shaft and extending through said part, said sector members having portions connected with said die members for actuating the latter to cause bending of the rows of conductor bar portions by said die members, means limiting the extent of angular movement of said sector members to correspond with the desired extent to which the conductor bar portions are to be bent, and means for causing simultaneous rocking of said sector members in opposite directions comprising a power device and toggle linkages connecting the sector members with said power device.

4. In a machine for shaping electrical coils of the type having substantially parallel conductor bar portions projecting from a hollow substantially ring shaped part in which said coils are assembled, a shaft, means for supporting said part so as to locate said coils in spaced annular relation around said shaft and with said conductor bar portions disposed in two substantially concentric rows, said shaft being of a length such that the end thereof extends beyond said part, a die head mounted on said shaft above said part and including two relatively rotatable die members having substantially concentric annular rows of slots adapted to receive said conductor-bar portions therein, a pair of sector members rockable about said shaft and extending through said part, said sector members having portions connected with said die members for actuating the latter to cause bending of the rows of conductor bar portions by said die members, means limiting the extent of angular movement of said sector members to correspond with the desired extent to which the conductor bar portions are to be bent, means for causing simultaneous rocking of said sector members in opposite directions, said shaft being axially movable for lifting said die head and disengaging said die members from said conductor bar portions, and means for imparting axial movement to said shaft.

5. In coil shaping apparatus of the character described, a support, a shaft projecting above said support, a pair of sector members rockable about said shaft and having driving elements at their upper ends, means on said support adapted to receive and hold a substantially ring-shaped hollow part in surrounding coaxial relation to said shaft and sector members and which part has substantially concentric rows of coil elements projecting therefrom, a die head on said shaft above said part and comprising relatively rotatable die members having substantially concentric rows of slots adapted to receive said rows of projecting coil elements therein, said head being axially slidable on said shaft to permit movement of the head toward said part for engaging said slots with said coil elements, said die members having connection with the driving elements of said sector members to be actuated by the rocking movement of the latter to cause bending of said projecting coil elements, and means for imparting rocking movement to said sector members.

6. Apparatus as defined in claim 5 in which said shaft is axially movable and has shoulder means thereon for engaging and lifting said die head and which includes means for causing such axial movement of said shaft.

7. Apparatus as defined in claim 5 in which said die head is adapted for quick disengagement from said shaft and driving elements of said sector members to permit removal of said part from its position surrounding said shaft and sector members.

8. Apparatus for shaping coil elements projecting in substantially concentric rows from a substantially ring shaped hollow part, comprising an upright die-actuating means, means for supporting said part in surrounding relation to said die-actuating means, removable die means for bending said coil elements, said die means being adapted to be applied to said coil elements and to be substantially simultaneously operably connected with said die-actuating means, and a power device connected with said die-actuating means for imparting movement thereto after said die means has been applied to said die-actuating means and said coil elements.

9. Apparatus for shaping coil elements projecting in substantially concentric rows from a substantially ring shaped hollow part, comprising an upright die-actuating means including relatively rotatable die-actuating members and a die-lifting means, means for supporting said part in surrounding relation to said die-actuating means, and a removable die head adapted to be mounted on said die-lifting means and having relatively rotatable die members engageable with said rows of coil elements and adapted to be substantially simultaneously operably connected with said die-actuating members.

10. Apparatus for shaping coil elements projecting in substantially concentric rows from a substantially ring shaped hollow part, comprising an upright die-actuating means including relatively rotatable die-actuating members and a die-lifting shaft, means for supporting said part in surrounding relation to said die-actuating means, a removable die head adapted to be mounted on said shaft and having relatively rotatable slotted die members engageable with said rows of coil elements and also adapted to be substantially simultaneously operably connected with said die-actuating members, said die head being axially shiftable on said shaft for causing such engagement and operable connection of said die members with said coil elements and die-actuating members, power means operably connected with said die-actuating members for imparting movement thereto, said shaft being axially shiftable for lifting said die head to disconnect the same from said coil elements after the shaping thereof, and means for imparting such axial movement to said shaft.

11. In a machine for shaping electrical coil portions projecting in an annular group from a substantially ring shaped hollow part, a table, an upright die actuating means comprising a pair of coextending spindle members mounted on said table for relative rotary movement and having portions extending above said table and other portions extending below said table, means on said table for supporting said part in surrounding relation to said spindle members, a die head comprising a pair of relatively rotatable die members having rows of annularly spaced slots adapted for engagement with said coil portions, said die head being adapted to be removably applied to said die-actuating means for releasable connection of said die members with said spindle members, a power device mounted on said table, and toggle linkages located below said table and operably connecting said other portions with said power device for actuation of said spindle members by the latter.

12. In a machine for shaping electrical coil portions projecting in an annular group from a substantially ring shaped hollow part, a table, an upright die-actuating means extending above said table and comprising an axially movable shaft and a pair of coextending spindle members adapted for relative rotary movement about said shaft, said shaft and spindle members having other portions extending below said table, means on said table for supporting said part in surrounding relation to said shaft and spindle members, a die head comprising a pair of relatively rotatable die members having rows of annularly spaced slots adapted for engagement with said coil portions, said die head being adapted to be removably applied to said die-actuating means and being shiftable axially of said shaft for engagement of said slots with said coil portions and the releasable connection of the die members with said spindle members, a power device mounted on said table, toggle linkages located below said table and operably connecting the other portions of said spindle members with said power device, a second power device connected with said shaft for imparting axial movement thereto, and shoulder means on said shaft and engageable with said die head for lifting the same.

JOHN B. LEECE.

REFERENCES CITED

The following references are of record in the file of this patent:

UNITED STATES PATENTS

| Number | Name | Date |
| --- | --- | --- |
| 1,238,957 | Tomlinson | Sept. 4, 1917 |
| 1,556,891 | Ahlers | Oct. 13, 1925 |
| 1,690,336 | Elsey | Nov. 6, 1928 |
| 1,703,188 | Elsey | Feb. 26, 1929 |

FOREIGN PATENTS

| Number | Country | Date |
| --- | --- | --- |
| 194,446 | Great Britain | Mar. 15, 1923 |